United States Patent

[11] 3,600,005

[72] Inventor Gordon K. Glaza
 Midland, Mich.
[21] Appl. No. 886,659
[22] Filed Dec. 19, 1969
[45] Patented Aug. 17, 1971
[73] Assignee The Dow Chemical Company
 Midland, Mich.

[54] KINGPIN AND SUPPORT MEMBER FOR A SEMITRAILER RIG
 9 Claims, 5 Drawing Figs.

[52] U.S. Cl. .................................................. 280/433
[51] Int. Cl. ............................................. B62d 53/08
[50] Field of Search .......................................... 280/433,
 407, 438

[56] References Cited
 UNITED STATES PATENTS

| | | | |
|---|---|---|---|
| 2,838,324 | 6/1958 | Dalton............................ | 280/407 |
| 2,915,320 | 12/1959 | Jewell et al. .................. | 280/433 X |
| 2,958,541 | 11/1960 | Bar................................ | 280/433 |
| 3,252,715 | 5/1966 | Chieger.......................... | 280/433 |

FOREIGN PATENTS 214,723  5/1958  Australia..................... 280/433

Primary Examiner—Leo Friaglia
Attorneys—Griswold & Burdick, V. Dean Clausen and William R. Norris ABSTRACT: A kingpin assembly and support member is provided, as part of a semitrailer underframe, for coupling the trailer to a tractor or other towing vehicle. The kingpin assembly includes a round steel pin with a threaded upper end and an internally threaded screwcap for engaging the threaded end of the pin. The pin body is a one-piece unit having an annular transverse plate positioned below the threaded end and spaced apart collar members positioned below the plate. The support member, which is a light metal alloy extrusion, such as aluminum or magnesium, is generally defined by spaced apart transverse deck sections joined by upstanding struts positioned between the decks. A heavy-duty strut in the support member has a vertical opening therein conforming to the shape of the kingpin and screwcap, to enable the kingpin to be removably fastened into the support member with the screwcap.

PATENTED AUG 17 1971

INVENTOR.
Gordon K. Glaza
BY
J. Dean Clausen
AGENT

PATENTED AUG 17 1971

INVENTOR.
Gordon K. Glaza
BY
J. Dean Clausen
AGENT

KINGPIN AND SUPPORT MEMBER FOR A SEMITRAILER RIG

BACKGROUND OF THE INVENTION

The invention relates broadly to a kingpin apparatus for coupling a semitrailer to a towing vehicle. More specifically, the invention pertains to the combination of a metal kingpin and support member for the pin, in which the kingpin is removably fastened into the support member.

In the usual commercial semitrailer rig the trailer is coupled to the fifth wheel of the tractor by a steel kingpin. The kingpin itself is permanently anchored, usually by welding, to a support member comprising a heavy steel weldment which forms a part of the semitrailer underframe. Although trailer manufactures have been successful in converting from steel to aluminum trailers in recent years, the kingpin supporting structure is still fabricated of heavy gauge steel. A particular disadvantage of the steel-supporting structure, of course, is the weight it adds to the trailer, which can amount to several hundred pounds. Another disadvantage of the conventional kingpin structure is that the pin is permanently anchored to the supporting structure. In this type of structure, whenever either the supporting structure or pin becomes worn from normal use or is damaged, the parts must first be separated with a torch or other metal-cutting device and the replacement parts reassembled by welding to form the new structure.

SUMMARY OF THE INVENTION

Accordingly, a broad object of the invention is to provide a kingpin and support member structure for a semitrailer rig which weighs substantially less than the prior structure, but which has sufficient strength characteristics to satisfactorily perform the towing operation.

A more specific object is to provide a structure as described in which the support member is fabricated of a light metal, such as aluminum or magnesium, and the kingpin is a solid steel pin adapted to be removably connected to the support member.

Broadly, the invention is directed to a kingpin assembly and a support member therefor, which forms part of a semitrailer underframe, as means for coupling the semitrailer to a towing vehicle. The kingpin is preferably a generally circular metal pin. An elongate upper portion of the pin carries a first fastening means adapted to lockingly engage a second fastening means carried by the kingpin support member, to thereby enable the pin to be removably fastened to the support member. The pin body includes an integral generally circular plate positioned below the first fastening means and extending transversely outwardly from the periphery of the pin body. The plate includes an integral upstanding rib positioned at the periphery thereof. An integral generally circular first collar member, of smaller diameter than the plate, is positioned on the pin body such that the upper end of the collar is integral with the underside of the plate. The pin body further includes an integral generally circular second collar positioned below the first collar.

A support member for the kingpin assembly is defined generally by a metal frame including an elongate transverse upper deck section and an elongate transverse lower deck section spaced apart from the upper deck section. The upper and lower deck sections are joined by a plurality of upstanding spaced apart minor strut members and a single upstanding major strut member positioned between the decks. The major strut member includes a generally circular vertical opening therethrough for carrying the kingpin assembly. Annular shoulder or inwardly sloping wall portions at the upper end of the vertical opening are adapted to mate with and support corresponding face portions of the second fastening means. The opening also defines an elongate portion below the shoulder or inwardly sloping wall portions adapted to snugly receive the elongate upper portion of the kingpin.

The drawings illustrate two of numerous embodiments within the scope of the invention, the forms shown being selected for convenient illustration and clear demonstration of the principles involved.

DESCRIPTION OF A PREFERRED EMBODIMENT

Figure 3:
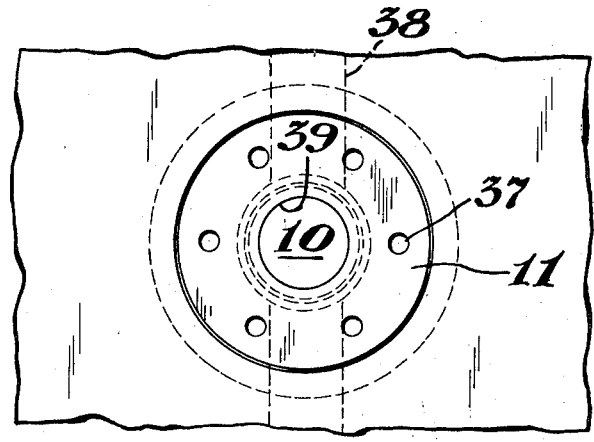
FIG. 3 is a fragmentary plan view of the kingpin, screwcap and support member, as illustrated in FIG. 2.
Figure 2:
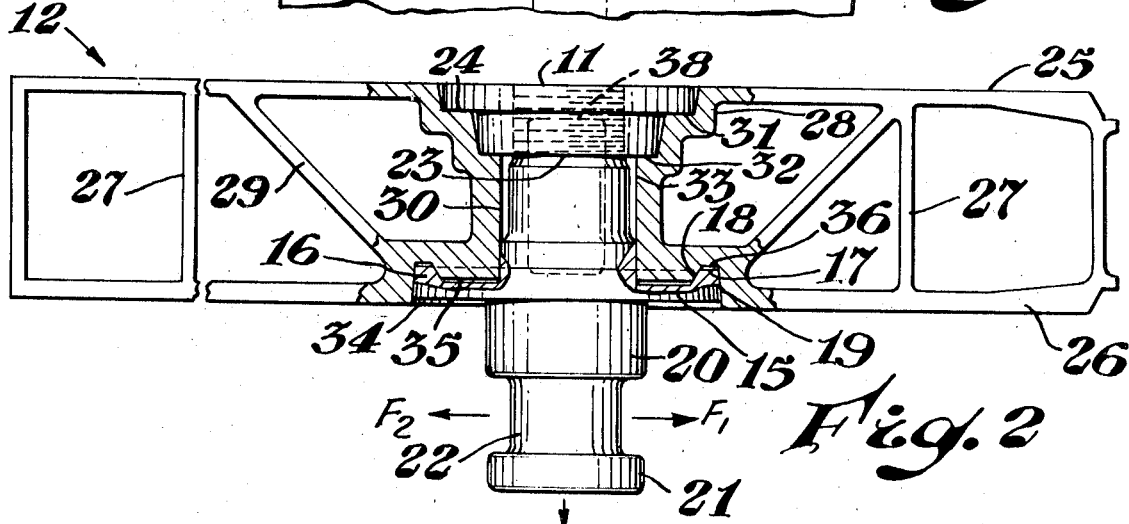
FIG. 2 is a side elevation view, partly in section, of the kingpin and screwcap of FIG. 1, the parts being shown in assembled relation on a support member for the kingpin.
Figure 1:
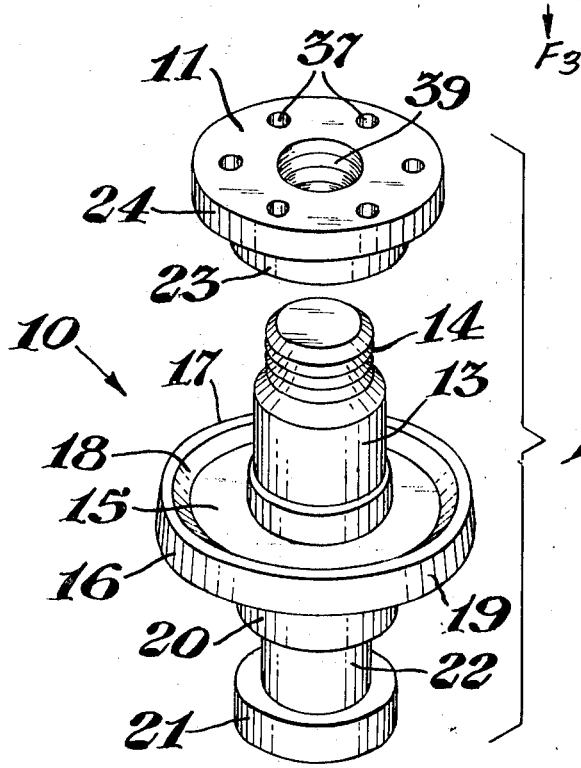
FIG. 1 is an exploded perspective view of a kingpin assembly according to a preferred embodiment of the invention, the assembly including the kingpin itself and a screwcap for engaging the pin.

Referring to FIGS. 1 and 2, there is illustrated one embodiment of a kingpin assembly and a support member for fastening the kingpin assembly to a semitrailer underframe. The kingpin assembly of FIG. 1 comprises basically a kingpin indicated generally by the numeral 10, and an internally threaded screwcap 11. In FIG. 2, the numeral 12 generally indicates a support member to which kingpin 10 may be removably fastened with screwcap 11, as explained in more detail hereinafter.

The kingpin 10 defines a preferably circular steel pin body with an elongate upper portion 13 having external threads 14 at the upper end thereof. Positioned on the pin body below the threaded portion 14 is an integral generally circular plate member 15, which extends transversely outwardly from the periphery of the pin body. An integral upstanding annular rib 16 is positioned at the periphery of the plate 15. Rib 16 is more specifically defined by a flattop 17 and downwardly sloping sides 18, 19. The kingpin 10 further includes a first collar member 20, of smaller diameter than plate 15, the entire collar being integral with the pin body and the upper end of the collar being integral with the underside of plate 15. A second collar member 21, which is integral with the pin body, is positioned below the first collar 20. Also, the portion of pin body 10 which lies between collar members 20 and 21 preferably defines an elongate or neck portion 22 of smaller diameter than either of the collar members. Regarding the collars 20 and 21 and the neck portion 22, the invention is not limited to the precise structure illustrated herein. It is contemplated that other mechanical variations as to size of the collar members with respect to each other, placement of the collars on the pin body, and the like, are within the expected skill of the art.

Screw cap 11 is an annular cap having internal threads 39 adapted to engage external threads 14 on kingpin 10, the cap thereby providing means for removably fastening the pin to support member 12. In order to fasten kingpin 10 to support member 12 the cap 11 is carried on the support member by means of shoulder portions on the support member which adapted to mate with face portions on the cap. Specifically, cap 11 includes an exterior lower face portion 23, defined generally by the hub face of the cap, and an exterior outer face portion 24, which extends peripherally beyond lower face 23 and is defined generally by the underside of the flangelike upper portion of the cap.

Means for carrying the kingpin assembly (i.e. kingpin 10 and screwcap 11) are provided by support member 12, which is a metal frame forming a section of the trailer underframe. Support members 12 generally defines an elongate transverse upper deck section 25 and a corresponding transverse lower deck section 26, which is spaced apart from the upper deck section. The decks 25 and 26 are joined by a plurality of upstanding spaced apart minor strut members 27, the strut members being positioned between the decks and preferably in transverse relation thereto. The decks 25 and 26 are also joined by a single upstanding major strut member 28, which is positioned between and preferably transverse to the deck sections. In a preferred embodiment of support member 12, a pair of diagonal strut members 29 connect the major strut member 28 to the immediately adjacent minor strut members 27.

A generally circular opening 30, which is adapted to receive the kingpin 10, extends vertically through the center of the major strut member 28. Opening 30 includes an annular upper shoulder 31 adapted to mate with the upper face portion 24 of screwcap 11. Positioned below shoulder 31 is a lower shoulder 32, which is smaller in diameter than shoulder 31 and which is adapted to mate with the lower face portion of the screwcap 11. An elongate portion of opening 30, as indicated at 33, is smaller in diameter than shoulder 32 and extends downwardly therefrom. As indicated in FIG. 2, the elongate portion 33 is adapted to snugly receive the elongate upper portion 13 of kingpin 10. The snug fit of pin 10 and portion 33 is not intended to be a binding fit, however. To prevent the pin from binding in the opening, the upper portion 13 of the pin is preferably slightly "necked in" below the threads 14, as indicated in FIG. 1.

Plate member 15 is carried in the support member 12 in an annular recess portion 34 of opening 30. As indicated in FIG. 2, the recess 34 is coplanar with shoulders 31 and 32 and extends peripherally outwardly from the lower end of elongate portion 33. The configuration of recess 34 is generally complementary to the configuration of plate member 15, to enable the recess to snugly receive the plate. Preferably, the plate member 15 fits into recess 34 with a slight amount of clearance being provided between the upper surface of plate 15 and the mating upper wall of recess 34, as indicated at 35. A slight amount of clearance is also provided between the flat-top 17 of rib 16 and the mating upper wall of recess 34, as indicated at 36. In a preferred embodiment the major strut member 28 includes a generally rectangular opening 38 therein, the opening extending centrally through the entire length of the strut member. A primary purpose of providing the opening 38 in strut 28 is to keep the weight of support member 12 down to the minimum possible without sacrificing strength requirements. Opening 38 also provides a rather large void in the support member, which facilitates extrusion of this member.

In use, the kingpin 10 is inserted into opening 30 of support member 12 and the screwcap 11 is threaded onto the pin. The cap 11 may be tightened down onto the kingpin 10 with a spanner wrench or other suitable tool adapted to engage gripping means, such as openings 37 in the top face of the cap. As the cap 11 is tightened down onto the pin 10, the face portions 23 and 24 of the cap bear against shoulders 32 and 31 of opening 30 in strut member 28. This causes plate member 15 to draw upwardly until the sloping sides 18 and 19 of rib 16 wedgingly engage the mating wall portions of recess 34. At this point the semitrailer can be coupled to the tractor by engaging the neck portion 22 of kingpin 10 with the slot provided on the fifth wheel of the tractor.

The kingpin assembly and support member coupling device of this invention has certain advantages over the conventional kingpin structures, particularly with regard to load bearing characteristics during towing of the trailer on the highway. In general, the forces acting on a kingpin during towing of the trailer are exerted in the directions indicated by the arrows in FIG. 2. Specifically, these forces might be designated as a lateral forward force ($\rightarrow F_1$), a lateral rearward force ($\rightarrow F_2$) and a downward force ($\rightarrow F_3$). The rearward force exerts a high bearing stress particularly on the lower rear section of elongate portion 33 of support member 12 (the lower left side of portion 33 as shown in FIG. 2). A substantial amount of the rearward force, however, is transferred from plate 15 to major strut member 28, due to the lateral extension of the plate into the strut member and also due to the fact that the sloping sides 18 and 19 of annular rib 16 snugly engage the corresponding wall portions of recess 34 in the strut member.

Generally speaking, a lateral forward force ($F_1$) is exerted on the kingpin only during abrupt braking of the tractor or in the event of collision, since the forward thrust of the trailer is almost entirely borne by the kingpin when a sudden stop is made. The downward force ($F_3$) exerted by the trailer on the kingpin serves to prevent the kingpin from disengaging from the slot in the tractor fifth wheel in which the pin fits, e.g. if the semitrailer rig should hit a large bump in the highway.

Figure 4:
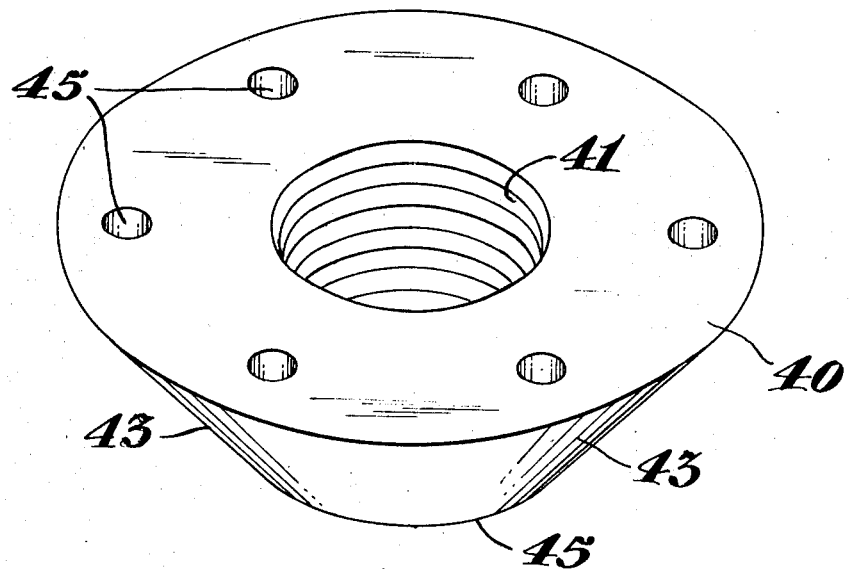
FIG. 4 is a perspective view of an alternative embodiment of a screwcap which may be used with the kingpin illustrated in FIG. 1.
Figure 5:
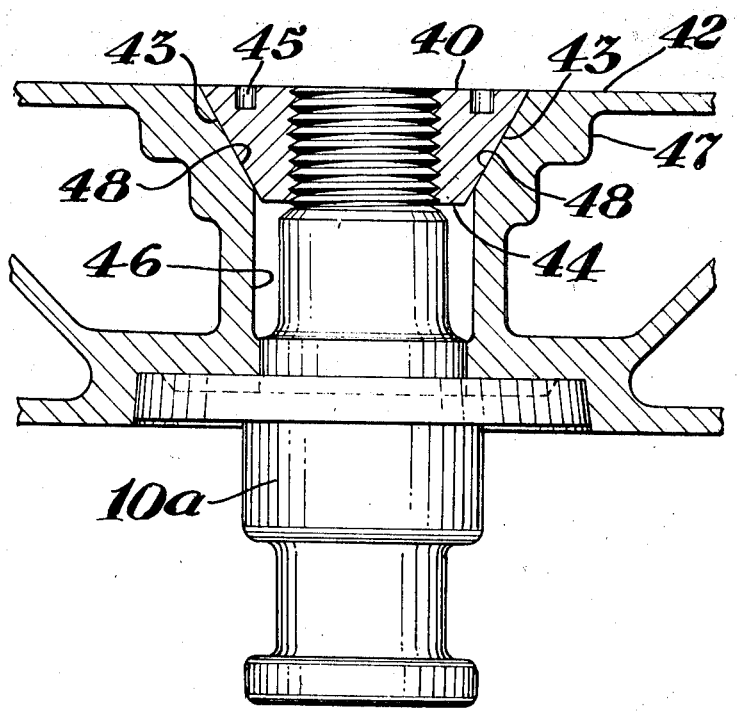
FIG. 5 is a fragmentary side elevation view, partly in section, of the kingpin embodiment illustrated in FIG. 1 and the screwcap of FIG. 4, the parts being shown in assembled relation on a support member for the kingpin.

In FIGS. 4 and 5 are illustrated an alternative embodiment of a screwcap and support member which may be used in the practice of the invention in conjunction with the kingpin 10a (identical to kingpin 10 shown in FIGS. 1 and 2) to couple a semitrailer to a towing vehicle. FIG. 4 depicts an annular screwcap 40 having internal threads 41 adapted to engage the external threads 14 on kingpin 10a, in order to removably fasten the pin to a support member 42, as shown in FIG. 5. Cap 40 includes annular sidewall 43 which tapers downwardly to a hub face 44. The top face of the cap has openings 45 therein, which are adapted to be engaged by a spanner wrench or other tool (in the same manner as the screwcap 11) to tighten the cap down onto the kingpin 10a.

Support member 42, as illustrated in FIG. 5 is identical to the support member 12 shown in FIGS. 1 and 2, except for the configuration of the upper part of circular opening 46 in major strut member 47 of support member 42. The upper part of opening 46 defines an annular funnel-shaped recess having a downwardly tapered sidewall 48 adapted to mate with sidewall 43 of cap 40 so that the cap may be carried on the support member. In use, when cap 40 is tightened down onto pin 10a, the tapered sidewalls of the cap and the funnel-shaped recess allow the cap to have a good "wedging" fit onto the support member.

What I claim is:

1. A kingpin assembly for use with a kingpin support member of a semitrailer underframe to couple a semitrailer to a towing vehicle, which comprises, in combination:

A. a generally circular pin body having an elongate upper portion including a first fastening means carried at the upper end of the elongate portion,
   B. a second fastening means adapted to be carried by the kingpin support member and adapted to lockingly engage the first fastening means to thereby enable the pin body to be attached to the kingpin support member,
   C. a generally circular plate member which:
      is integral with the pin body, extends transversely outwardly from the periphery of the pin body,
      is positioned on the pin body below the first fastening means,
      has an integral upstanding rib member, the rib member being adapted to snugly engage a complementary recess portion in the said kingpin support member,
   D. a generally circular first collar member which:
      is integral with the pin body,
      is integral at its upper end with the underside of the plate member,
      has a smaller diameter than the plate member,
   E. a generally circular second collar member which:
      is integral with the pin body,
      is positioned below the first collar member.

2. The kingpin assembly of claim 1 in which:
   A. the pin body is a metal pin body in which the elongate upper portion is externally threaded at its upper end,
   B. the second fastening means is defined by an annular internally threaded screwcap adapted to threadably engage the pin body, the screwcap having an exterior lower face portion and an exterior upper face portion positioned above and extending peripherally beyond the lower face portion, C. the second collar member is positioned a short distance below the first collar member.

3. The kingpin assembly of claim 1 in which the integral upstanding rib member on the plate member is an annular rib having a flat top and downwardly sloping sides.

4. The kingpin assembly of claim 1 in which:
A. the pin body is a metal pin body in which the elongate upper portion is externally threaded at its upper end,
B. the second fastening means is defined by an annular internally threaded screwcap adapted to threadably engage the pin body, the screwcap having a downwardly tapering sidewall terminating at a hub face.

5. In a semitrailer underframe, the combination of a kingpin assembly and a kingpin support member for coupling a semitrailer to a towing vehicle, the combination comprising:
A. a kingpin assembly defining a generally circular pin body which includes:
an elongate upper portion which is externally threaded at the upper end thereof,
a generally circular plate member integral with the pin body and extending transversely outwardly from the periphery of the pin body, the plate member being positioned below the threaded portion of the pin body, the plate member including an integral upstanding annular rib at the periphery of the plate, the rib having a flattop and downwardly sloping sides,
a generally circular first collar member integral with the pin body and having a smaller diameter than the plate member, the upper end of said collar member being integral with the underside of the plate member,
a generally circular second collar member, the second collar member being integral with the pin body and positioned below the first collar member,
an internally threaded annular screwcap adapted to threadably engage the pin body, the cap having an exterior lower face portion and an exterior upper face portion positioned above and extending peripherally beyond the lower face portion,
B. a support member for carrying the kingpin assembly, as defined by a light metal allow frame which includes:
an elongate transverse upper deck section,
an elongate transverse lower deck section, which is spaced from the upper deck section,
a plurality of upstanding spaced apart minor strut members positioned between and joining said upper and lower deck sections,
a single upstanding major strut member positioned between and joining said upper and lower deck sections,
a generally circular opening extending vertically through the center of the major strut member, said opening including an annular upper shoulder adapted to mate with the upper face portion of the screwcap, an annular lower shoulder of smaller diameter than the upper shoulder, the lower shoulder being positioned below the upper shoulder and adapted to mate with the lower face portion of the screwcap, an elongate portion of smaller diameter than the lower shoulder portion and extending downwardly therefrom, the elongate portion being adapted to snugly receive the elongate upper portion of the pin body, an annular recess portion coplanar with the upper and lower shoulders of the opening and extending outwardly from the lower end of the elongate portion, the configuration of the recess portion being complementary to the configuration of the plate member to thereby enable the recess portion to snugly receive said plate member.

6. The combination of claim 5 in which the minor strut members are positioned transversely of the upper and lower deck sections.

7. The combination of claim 5 in which the major strut member is positioned transversely of the upper and lower deck sections.

8. The combination of claim 5 in which the major strut member has a rectangular opening extending longitudinally centrally through that portion of the strut member not occupied by the said vertically disposed circular opening.

9. In a semitrailer underframe, the combination of a kingpin assembly and a kingpin support member for coupling a semitrailer to a towing vehicle, the combination comprising:
A. a kingpin assembly defining a generally circular pin body which includes:
an elongate upper portion which is externally threaded at the upper end thereof,
a generally circular plate member integral with the pin body and extending transversely outwardly from the periphery of the pin body, the plate member being positioned below the threaded portion of the pin body, the plate member including an integral upstanding annular rib at the periphery of the plate, the rib having a flattop and downwardly sloping sides,
a generally circular first collar member integral with the pin body and having a smaller diameter than the plate member, the upper end of said collar member being integral with the underside of the plate member,
a generally circular second collar member, the second collar member being integral with the pin body and positioned below the first collar member,
an annular internally threaded screwcap adapted to threadably engage the pin body, the cap having a downwardly tapering sidewall terminating at a hub face,
B. a support member for carrying the kingpin assembly, as defined by a metal frame which includes;
an elongate transverse upper deck section,
an elongate transverse lower deck section, which is spaced from the upper deck section,
a plurality of upstanding spaced apart minor strut members positioned between and joining said upper and lower deck sections,
a single upstanding major strut member positioned between and joining said upper and lower deck section,
a generally circular opening extending vertically through the center of the major strut member, the upper part of said opening defining a first annular funnel-shaped recess having downwardly tapering sidewalls adapted to mate with the downwardly tapering sidewalls of the screwcap, the opening further defining an elongate portion positioned below the annular funnel-shaped recess, and adapted to snugly receive the elongate upper portion of the pin body, the opening further defining a second annular recess portion positioned below the elongate portion, the second recess having a configuration complementary to the configuration of the plate member to thereby enable the recess portion to snugly receive said plate member.